United States Patent [19]
Miyake et al.

[11] Patent Number: 5,648,963
[45] Date of Patent: Jul. 15, 1997

[54] INPUT AND OUTPUT SIDE CONVERSION INTERFACES FOR AN ATM EXCHANGE

[75] Inventors: Hiroshi Miyake; Yasuhiro Aso; Shuji Yoshimura, all of Kawasaki, Japan

[73] Assignee: Fujitsu Limited, Kanagawa, Japan

[21] Appl. No.: 957,173

[22] Filed: Oct. 7, 1992

[30] Foreign Application Priority Data

Oct. 7, 1991 [JP] Japan ................. 3-259096

[51] Int. Cl.⁶ .................................. H04C 11/16
[52] U.S. Cl. ................. 370/218; 370/395; 370/396
[58] Field of Search ................. 370/94.1, 94.2, 370/60, 60.1, 58.1, 58.2, 58.3, 16, 14, 13, 55, 100.1, 102, 105.1, 110.4, 388, 395, 396, 397, 386, 218, 219, 220, 217; 340/825.14, 825.16; 375/114

[56] References Cited

U.S. PATENT DOCUMENTS

| | | | |
|---|---|---|---|
| 4,797,589 | 1/1989 | Collins | 370/63 |
| 4,858,224 | 8/1989 | Nakano et al. | 370/16 |
| 4,993,018 | 2/1991 | Hajikano et al. | |
| 5,016,248 | 5/1991 | Kudoh | 370/94.1 |
| 5,058,111 | 10/1991 | Kihara et al. | 370/60.1 |
| 5,072,440 | 12/1991 | Isono et al. | 370/60 |
| 5,084,867 | 1/1992 | Tachibana et al. | |
| 5,101,404 | 3/1992 | Kunimoto et al. | 370/60 |
| 5,134,609 | 7/1992 | Mori et al. | 370/105.1 |
| 5,191,577 | 3/1993 | Uchida et al. | |
| 5,337,323 | 8/1994 | Rokugawa et al. | |
| 5,386,109 | 1/1995 | Ikeuchi et al. | |

FOREIGN PATENT DOCUMENTS

| | | |
|---|---|---|
| 2-104148 | 4/1990 | Japan . |
| 2-104149 | 4/1990 | Japan . |
| 5-183526 | 7/1993 | Japan . |
| 5-227243 | 9/1993 | Japan . |

*Primary Examiner*—Douglas W. Olms
*Assistant Examiner*—Ajit Patel
*Attorney, Agent, or Firm*—Nikaido Marmelstein Murray & Oram LLP

[57] ABSTRACT

An ATM exchange which is comprised of a multistage cascade connection of ATM switches of self-routing module structures which are provided with a plurality of outgoing lines and incoming lines, wherein it provides at the output side and the input side of the ATM switches output side conversion interfaces and input side conversion interfaces both for connection of adjoining ATM switches and uses optical cables to connect the output side interfaces and input side interfaces facing thereto. By this, it is possible to maintain the correct exchange operation even if the length of the transfer lines (outgoing lines and incoming lines) laid between ATM switches becomes greater along with extension of the ATM switches in the exchange.

26 Claims, 12 Drawing Sheets

INPUT AND OUTPUT SIDE CONVERSION INTERFACES FOR AN ATM EXCHANGE

BACKGROUND OF THE INVENTION

1. Field of the Invention

The present invention relates to an exchange, more particularly to an asynchronous transfer mode (ATM) exchange which is comprised of a multistage cascade connection of ATM switches of self-routing module structures which are provided with n number of outgoing lines and N number of incoming lines and perform electrical processing for the exchange of ATM cells from the incoming lines and output the same to predetermined outgoing lines.

ATM switches of the above-mentioned self routing module (SRM) construction autonomously determine paths for ATM cells input from the incoming lines and output them to predetermined outgoing lines. Usually, such ATM switches are connected in a multistage cascade arrangement to form multistage self routing (MSSR) switches which in turn form the exchange. Exchanges comprised of such ATM switches are coming into use as they are able to perform exchange processing of large amounts of data such as video data at a high speed.

2. Description of the Related Art

The present invention relates primarily to the portion of the outgoing lines and incoming lines. In the past, ATM cells (data) exchanged at a high bit rate of, for example, 1.2 Gbps or 2.4 Gbps by a preceding ATM switch were passed through outgoing lines and incoming lines mainly comprised of coaxial cables and transferred to the next ATM switch.

There are, however, frequent demands for extension of exchanges to deal with insufficient line capacity. When extending exchanges, the practice is to increase the number of lines N in the N×N construction SRM's. For example, a 4×4 construction SRM is extended to an 8×8 construction SRM or to a 16×16 SRM or 64×64 SRM.

In this case, as will be explained later with reference to the figures (FIGS. 3, 4, and 5), if the scale of the switches is increased, the coaxial cables laid between each two adjacent stages become larger.

Connection of larger coaxial cables between ATM switches requires a certain amount of space to be secured between the different ATM switches and mounting of ATM switch boards on racks. If laying such a large amount of coaxial cables on the racks, however, the coaxial cables become as long as, for example, 100 meters.

Since high speed electrical signals of, for example, 1.2 Gbps are transferred on such coaxial cables, a length of 100 meters would mean a significant signal delay arising from stray capacities etc. and the danger of data error arising.

As a means of dealing with this, it may be considered to bundle in parallel 120 coaxial cables per highway, for example, and reduce the bit rate of the electrical signals transferred on the coaxial cables equally to 1/120 (10 Mbps). If this is done, however, the racks in the exchange would be buried in a tremendous number of coaxial cables, so this is really not practical.

SUMMARY OF THE INVENTION

Therefore, the present invention, in consideration of the above problem, has as its object the provision of an ATM exchange which is free from the occurrence of data error even with a longer length of signal lines (incoming lines and outgoing lines) laid between ATM switches resulting from the extension of the ATM switches.

To attain the above object, the present invention provides at the output side and the input side of the ATM switches output side conversion interfaces and input side conversion interfaces for connection of adjoining ATM switches and uses optical cables to connect the output side interfaces and input side interfaces facing thereto.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
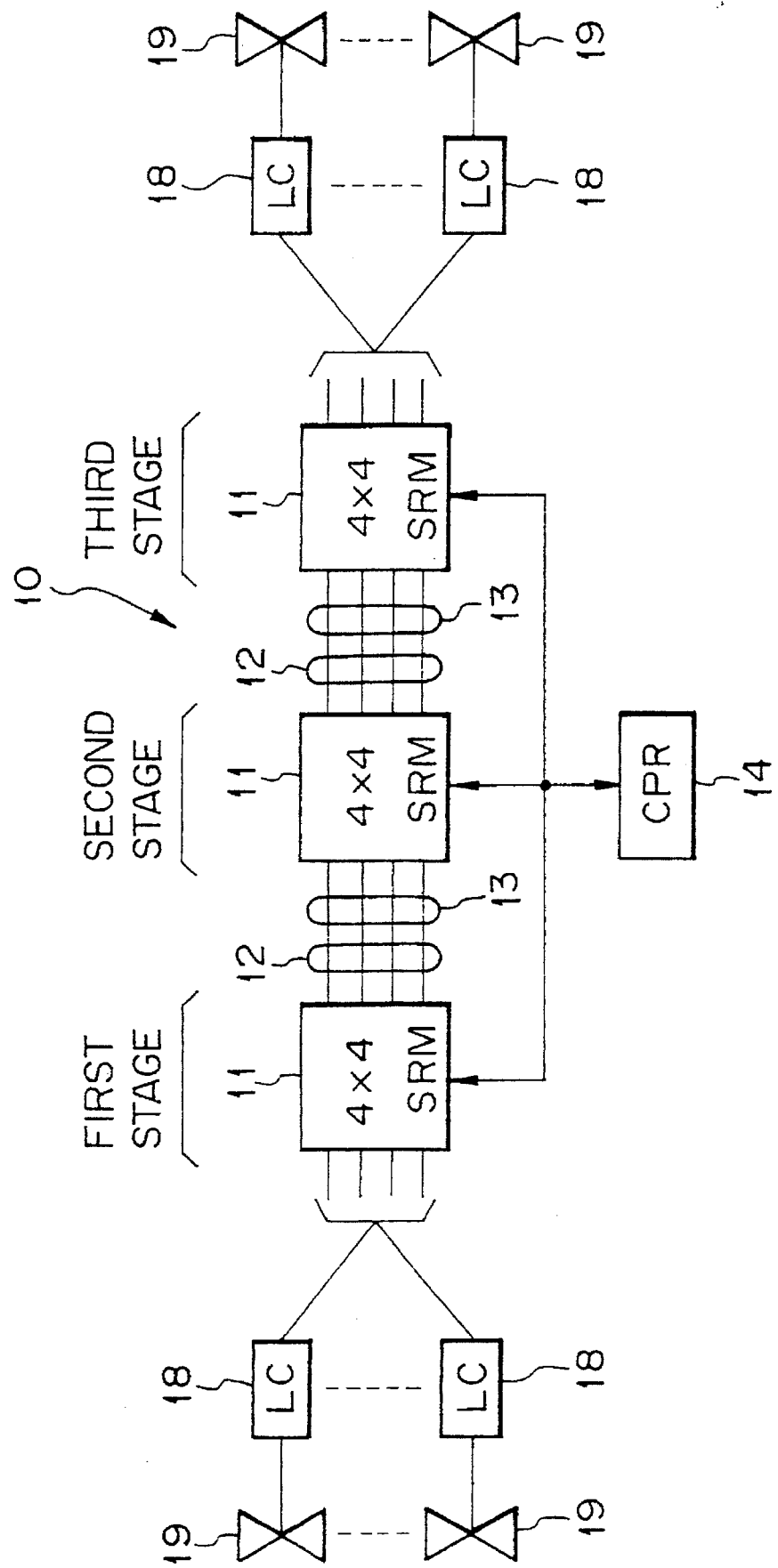
FIG. 1 is a view showing a prior art example of an exchange for performing exchanging processing on ATM cells.

FIG. 1 is a view showing a prior art example of an exchange for performing exchanging processing on ATM cells. In the figure, as one example, there is shown the case of the construction of an MSSR switch 10 by connecting in cascade three ATM switches 11 of an SRM construction. The ATM switches 11 are each provided with four outgoing lines 12 and four incoming lines 13, i.e., are of a so-called 4×4 SRM construction.

Call processing, fault monitoring, and maintenance are performed on the MSSR switch 10 by a call processor (CPR) 14. The MSSR switch 10 and the CPR 14 constitute the heart of the exchange. The exchange is connected to other exchanges or to subscriber terminal equipment 19 to be accommodated by the exchange through corresponding line circuits (LC) 18.

Taking note here of the portion of the above-mentioned outgoing lines 12 and incoming lines 13, as mentioned earlier, in the prior art, ATM cells (data) exchanged at a high bit rate of, for example, 1.2 Gbps or 2.4 Gbps by a preceding ATM switch 11 were passed through outgoing lines 12 and incoming lines 13 comprised mainly of coaxial cables and transferred to the next ATM switch 11.

Figure 2:
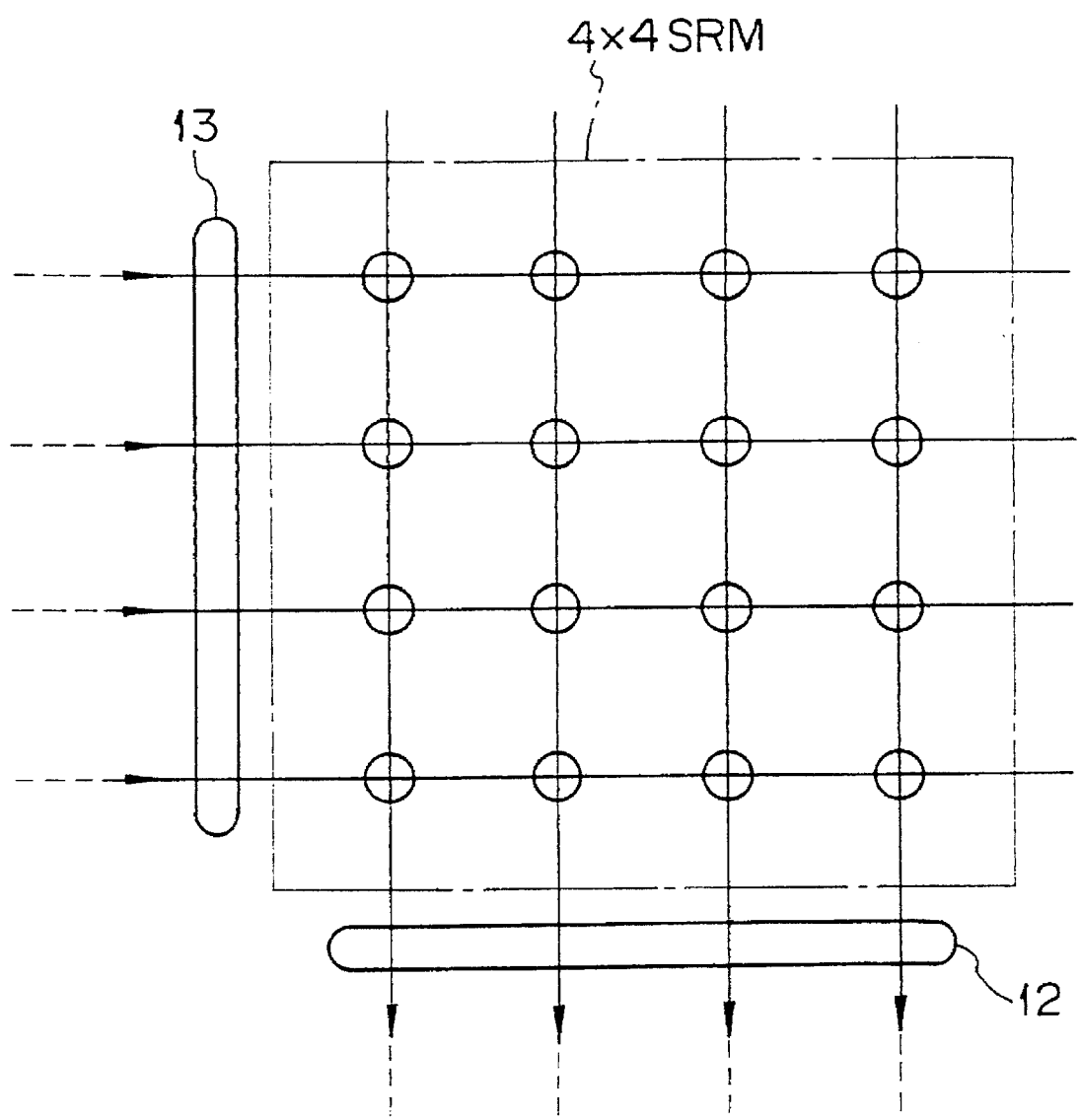
FIG. 2 is a view of the basic construction of a 4×4 SRM.

FIG. 2 is a view of the basic construction of a 4×4 SRM. It shows the above-mentioned 4×4 SRM construction ATM switch 11 in a simple format. In the figure, the incoming lines 13 and outgoing lines 12 are arranged in a matrix. Exchange routes from the incoming to outgoing lines are formed through the cross points (shown by the circles in the figure). Which cross points are passed through is autonomously determined by the control information (header) of the ATM cells.

The SRM's are not limited to 4×4 constructions. N×N (where N is an integer of 2 or more) SRM's may also be realized by N number of outgoing lines 12 and N number of incoming lines 13.

Note that exchanges are usually given a complete duplex redundant structure, wherein an active part and a standby part are constructed. For simplification here, however, only one of these parts is shown (same below).

Figure 3:
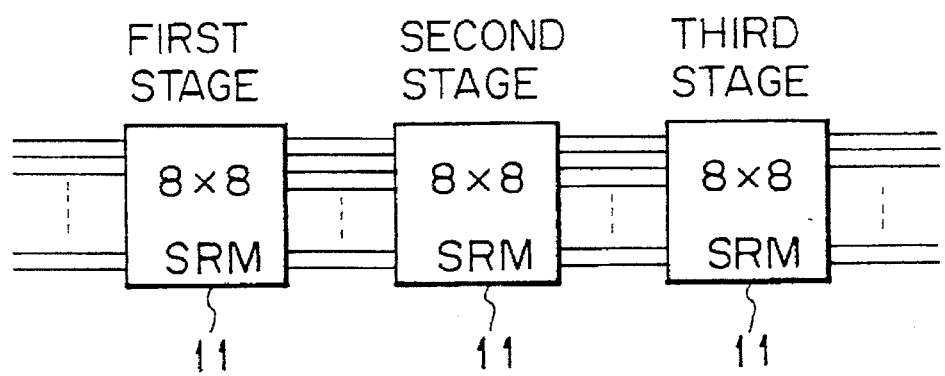
FIG. 3 is a view of an example of extension to an 8×8 SRM construction.
Figure 4:
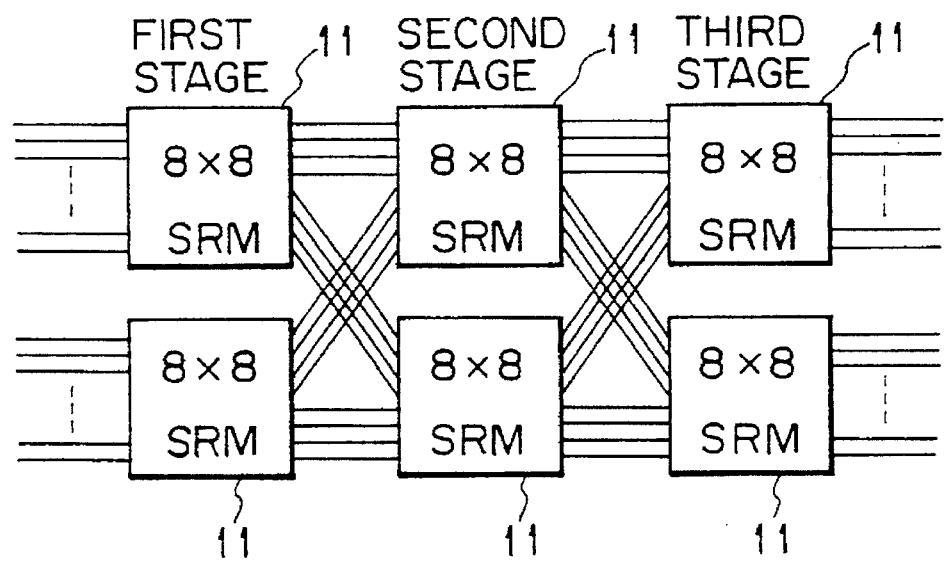
FIG. 4 is a view of an example of extension to a 16×16 SRM construction.
Figure 5:
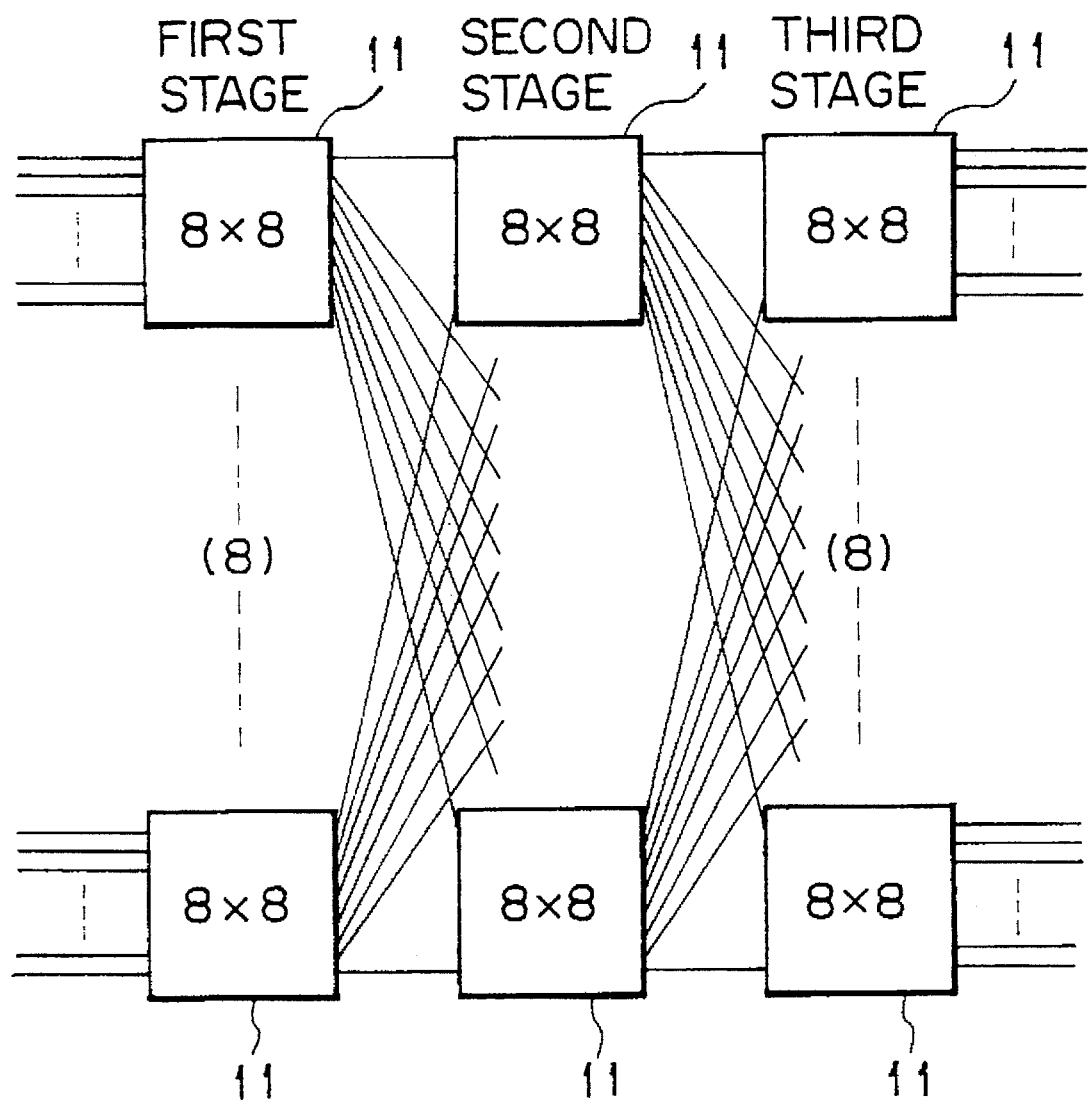
FIG. 5 is a view of an example of extension to a 64×64 SRM construction.

As mentioned above, the present invention has as its object to eliminate the problem of the greater length of signal lines laid between ATM switches due to the extension of ATM switches and the resultant occurrence of data error. In extending an exchange, the general practice is to increase 4×4 construction SRM's to 8×8 construction SRM's or 16×16 SRM's or 64×64 SRM's. The manner of this extension is illustrated in FIG. 3, FIG. 4, and FIG. 5. FIG. 3 is a view of an example of extension to an 8×8 SRM construction; FIG. 4 is a view of an example of extension to a 16×16 SRM construction; and FIG. 5 is a view of an example of extension to a 64×64 SRM construction. Illustration of the CPR 14, the subscriber line circuits 18 outside the exchange, and the subscriber terminal equipment 19 is omitted. As clear from FIG. 3, FIG. 4, and FIG. 5, however, when switches are increased in size, the coaxial cables laid between them become larger.

Figure 6:
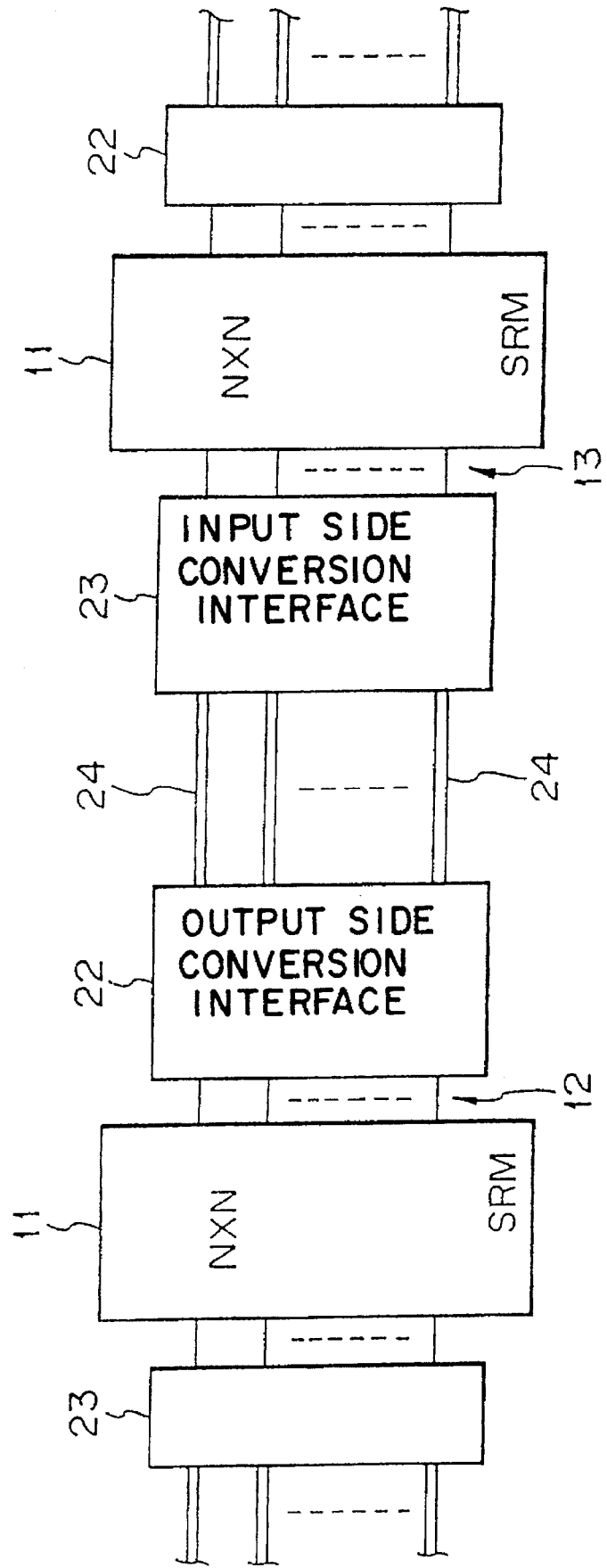
FIG. 6 is a view of the basic construction of the present invention.

FIG. 6 is a view of the basic construction of the present invention. In the figure, the constituent elements given reference numerals 22, 23, and 24 are new elements. These are an output side conversion interface, an input side conversion interface, and optical cables.

That is, an output side conversion interface 22 and an input side conversion interface 23 both for connecting adjoining ATM switches 11 are provided at the output side and the input side, respectively, of each of the ATM switches 11. The output interfaces 22 and the input side conversion interfaces 23 facing thereto are connected by optical cables 24 thereby forming the exchange.

Even if the number of ATM switches 11 increases due to an extension of the exchange and therefore the transfer lines (incoming lines and outgoing lines) become longer, since the transfer lines are optical cables, the problem of data error can be kept down. The reason is that, as is well known, optical cables can transmit optical data at a superhigh speed without problems even over an extremely long distance of tens of kilometers.

Conversion interfaces 22 and 23 are added to the output sides and the input sides of the ATM switches 11, which operate using electrical signals, in order to incorporate the optical cables.

Adjoining ATM exchanges, that is, the outsides of ATM exchanges, are usually connected by optical cables, but no thought is usually given to introducing optical cables inside the ATM exchanges. In this case, looking at this from another angle, by attaching output side and input side conversion interfaces to each of the plurality of ATM switches 11 constituting the inside of an ATM exchange, they function as ATM exchanges in themselves.

Figure 7:
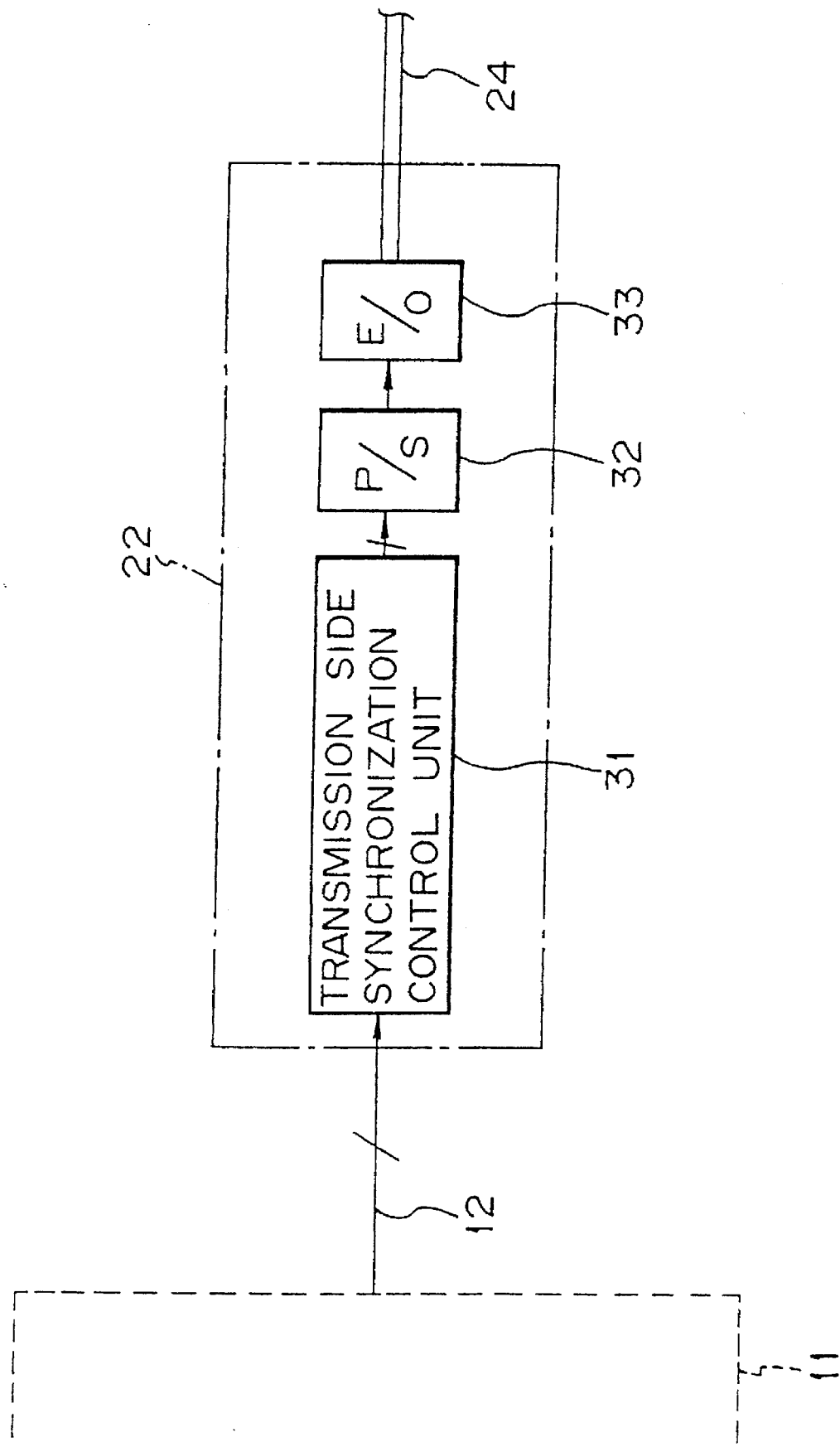
FIG. 7 is a view of an embodiment of an output side conversion interface.

FIG. 7 is a view of an embodiment of an output side conversion interface. For simplification, however, only one optical cable 24 is shown. The other optical cables are of exactly the same construction.

In FIG. 7, the output side conversion interface 22 is provided with an electrical/optical converter (E/O) 33 at its output side. Optical signals are output to the optical cable 24 from this.

At the input side of the electrical/optical converter (E/O) 33, there is provided a parallel/serial converter (P/S) 32. Usually, ATM cells are processed by parallel signals so as to increase the speed of ATM cell exchange processing. Therefore, the optical cables 24 may be made parallel lines as well, but in actuality optical jitter etc. occurs among optical cables and variances between bits occur, so it becomes difficult to process signals at the receiving end of the optical cables. Therefore, the parallel signals are converted once to serial signals to make them compatible with the optical cables and optical serial signals are sent to the opposing ATM switches. This is the function of the parallel/serial converter 32.

At the input side of the parallel/serial converter 32 is provided a transmission side synchronization control unit 31. This is for performing synchronization of signals transferred between the transmitting side and receiving side of the optical cables 24. If adjoining ATM switches 11 are connected by coaxial cables as in the past, this synchronization control unit 31 would be unnecessary, but synchronization is required between the transmitting side and receiving side for transmission of optical signals by parallel/serial conversion and inverse serial/parallel conversion.

Figure 8:
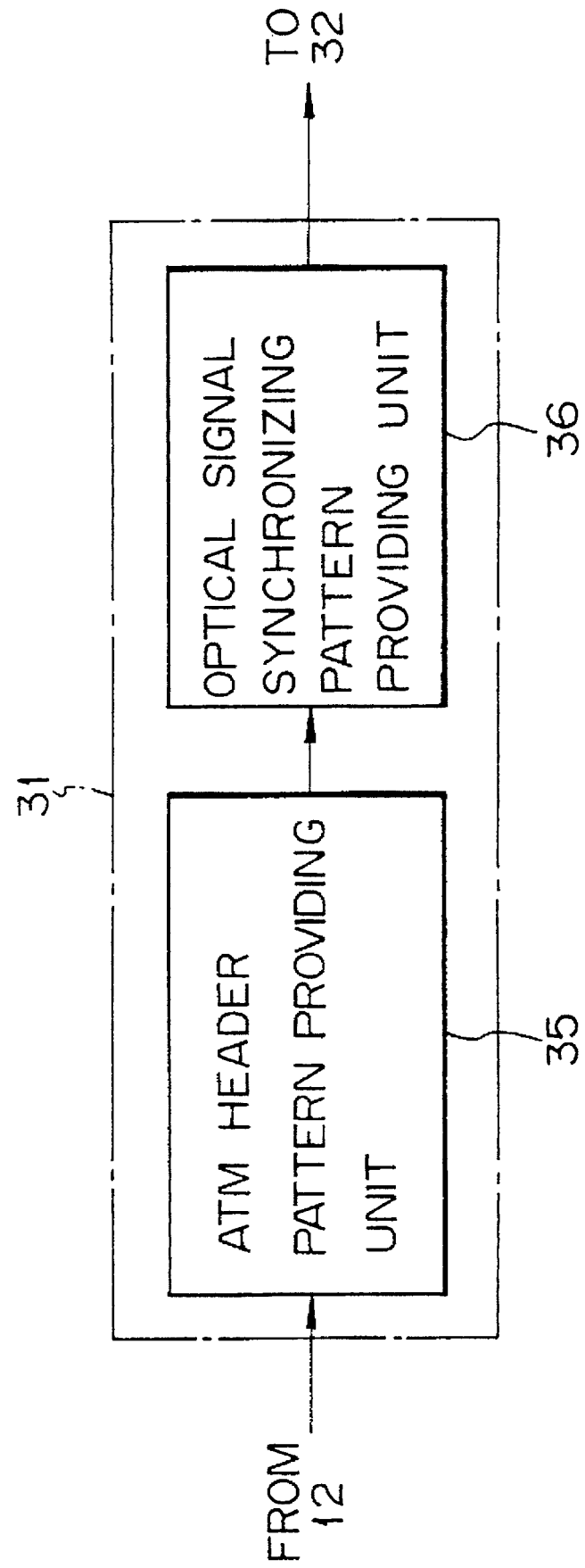
FIG. 8 is a view of an example of the construction of a transmission side synchronization control unit.

FIG. 8 is a view of an example of the construction of a transmission side synchronization control unit. The transmission side synchronization control unit 31, as illustrated, is provided with an optical signal synchronizing pattern unit 36. This is for synchronization of the optical signals transmitted over the optical cables 24. Specifically, it is realized by an overhead inserter. This utilizes the first 5 byte header portion of 53 byte construction ATM cells, specified by the CCITT, and writes a specific pattern into a particular unused area in it.

The transmission side synchronization control unit 31 of FIG. 8, as illustrated, is provided with an ATM header pattern unit 35. This is for performing synchronization of ATM cells themselves included in the optical signals sent over the optical cables 24. That is, it extracts units of ATM cells from the bit trains of optical signals. Specifically, it uses the HEC (header error control) area at the first 5 byte header portion of 53 byte construction ATM cells, defined by the CCITT, and writes synchronizing patterns for the ATM cells themselves into the HEC area. Usually, the HEC area is used for detection of synchronization of ATM cells among opposing ATM exchanges, but is unnecessary in the ATM exchanges and therefore is erased. Therefore, the erased HEC area is used for the detection of synchronization of ATM cells among opposing ATM switches.

Figure 9:
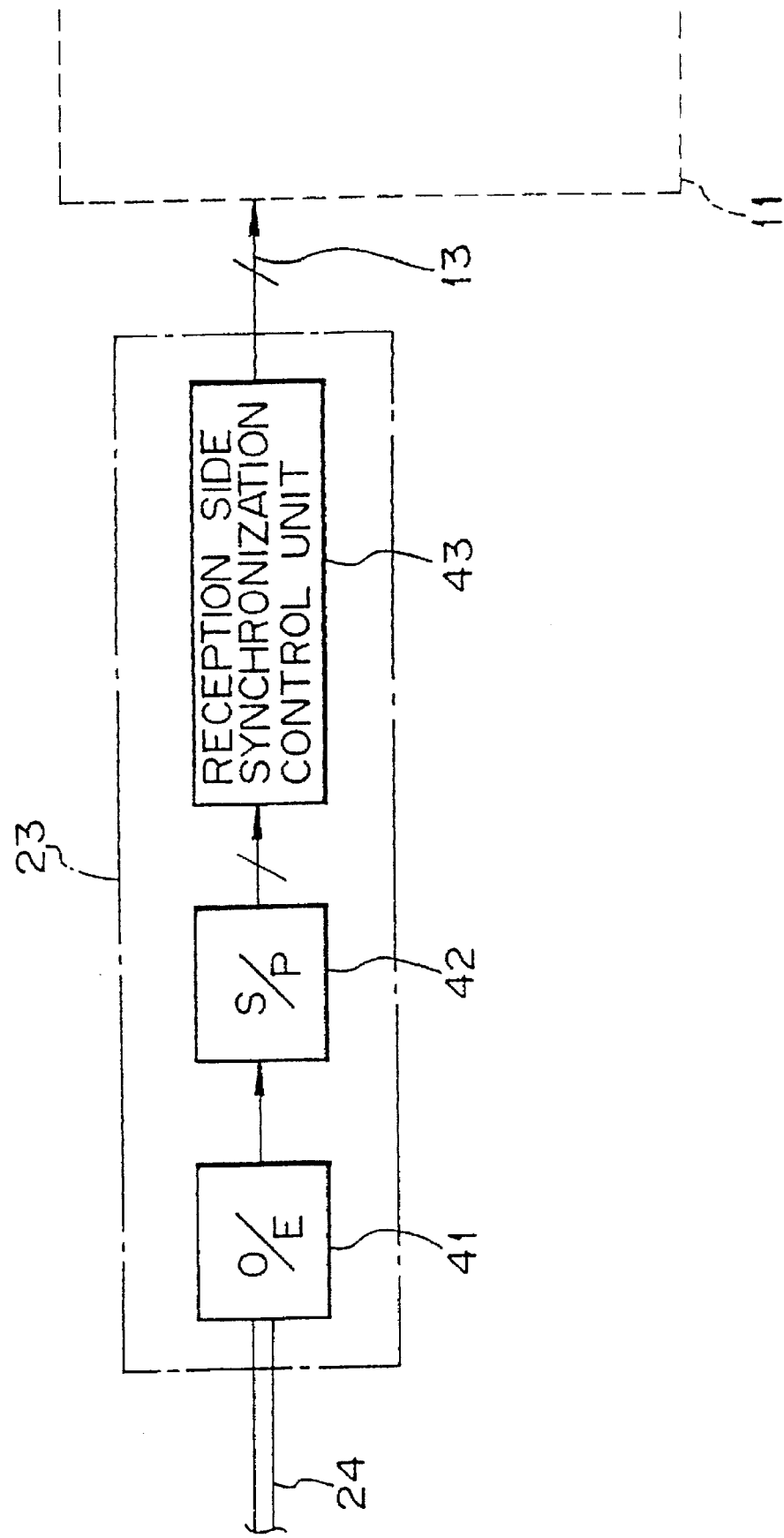
FIG. 9 is a view of an embodiment of an input side conversion interface.

FIG. 9 is a view of an embodiment of an input side conversion interface. First, an optical/electrical converter (O/E) 41 is provided at the input of the input side conversion interface 23. The optical serial signals from the optical cables 24 are converted to electrical serial signals. Note that like in the explanation of the transmission side, only one optical cable 24 is shown. At the output side of the optical/ electrical converter 41 is provided a serial/parallel converter (S/P) 42, where the signals are returned to parallel signals. The significance of the serial/parallel conversion is as explained with reference to the parallel/serial converter 32.

At the output side of the serial/parallel converter 42 is provided a reception side synchronization control unit 43. The reception side synchronization control unit 43 cooperates with the transmission side synchronization control unit 31 to obtain synchronization of the optical signals sent over the optical cables 24.

Figure 10:
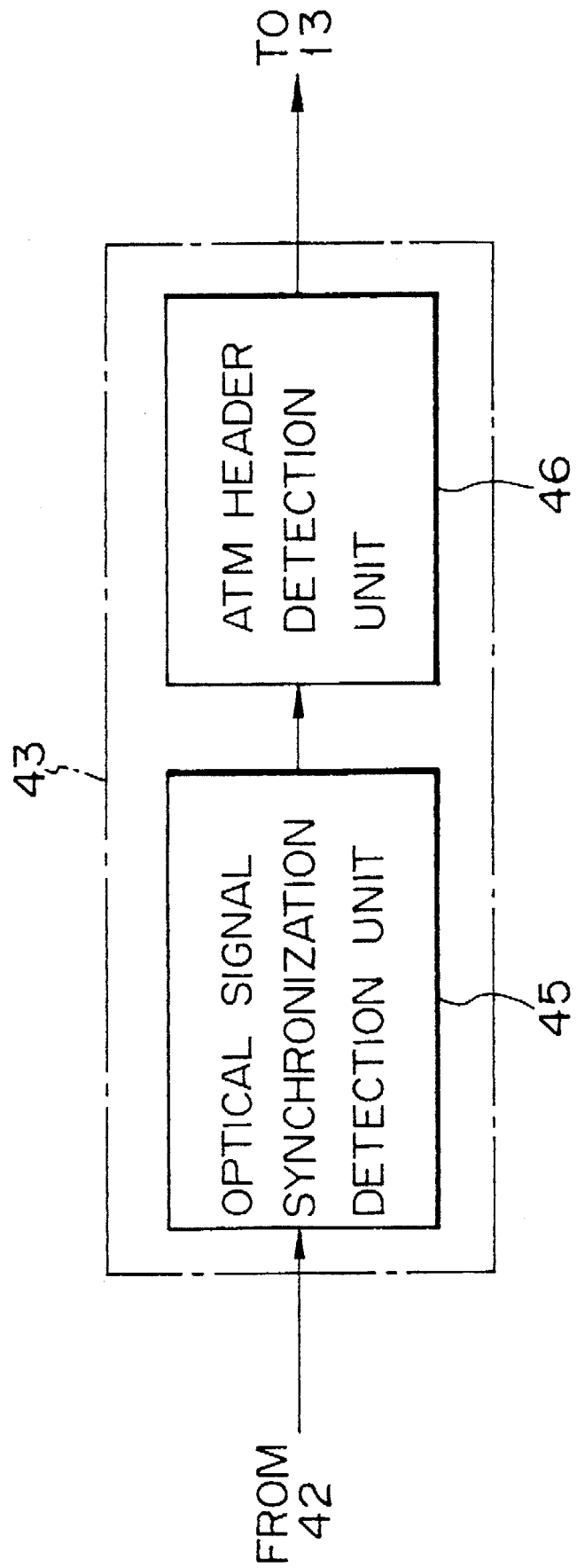
FIG. 10 is a view of an example of the construction of a reception side synchronization control unit.

FIG. 10 is a view of an example of the construction of a reception side synchronization control unit. This operates together with the portions 35 and 36 shown in FIG. 8. As shown in FIG. 10, the parts operating paired with the same are the optical signal synchronization detection unit 45 and the ATM header detection unit 46. Based on the example of the construction of the transmission side shown in FIG. 8, the optical signal synchronization detection unit 45 detects a particular pattern inserted in a particular area by the overhead bit inserter and synchronizes with the transmission side. In this case, the synchronization is performed adaptively following a signal received from a phase-locked oscillator (PLO)70. The ATM header detection unit 46 detects the synchronizing pattern written in the HEC area at the transmission side and synchronizes the ATM cells themselves.

Figure 11:
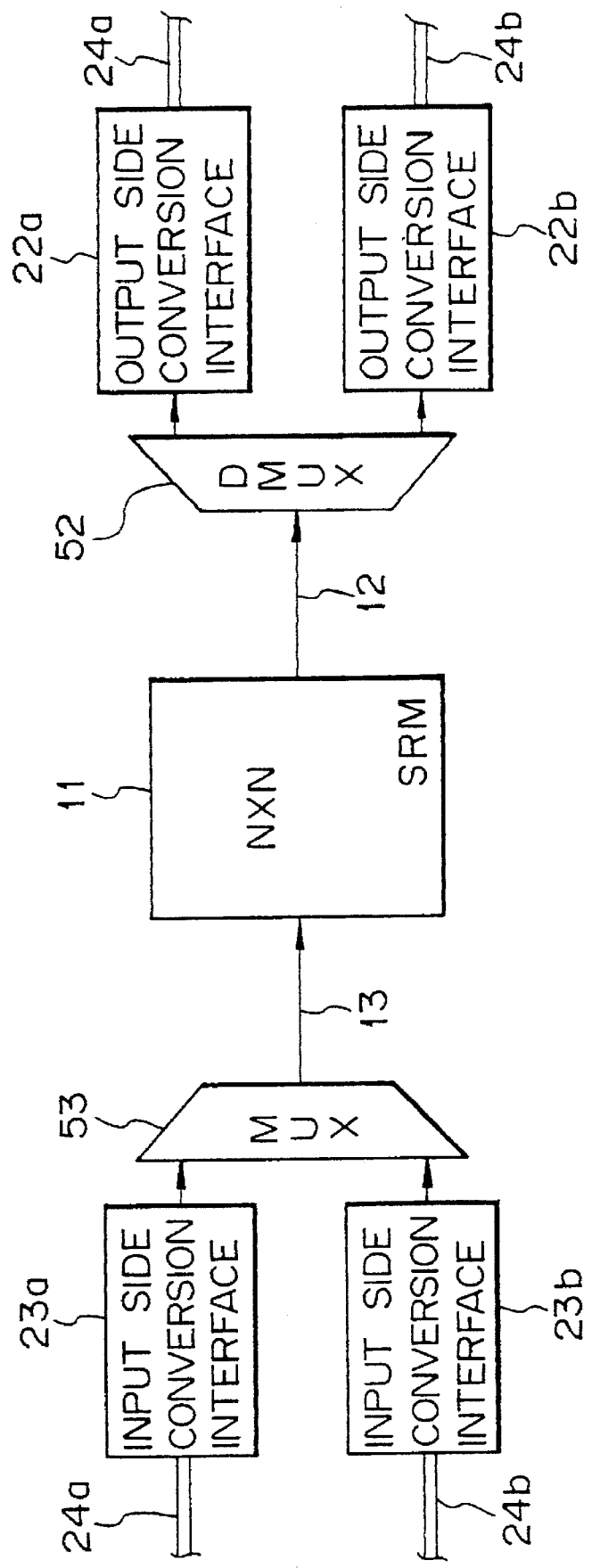
FIG. 11 is a view of a modification of the construction of FIG. 6.

FIG. 11 is a view of a modification of the construction of FIG. 6. The difference from the construction of FIG. 6 is that the demultiplexer unit (DMUX) 52 and multiplexer unit (MUX) 53 are provided for each of the outgoing lines 12 and the incoming lines 13.

As mentioned above, the ATM switches 11 operate at a high speed bit rate of 1.2 Gbps, for example. Therefore, the load on the output side conversion interface 22 and the input side conversion interface 23 becomes considerably large. Therefore, the demultiplexer unit 52 and multiplexer unit 53 are added. If this is done, then the output side conversion interface 22 can be split into, for example, two (two system) output side conversion interfaces 22a and 22b, as shown in FIG. 11. By this, according to this example, the output side conversion interfaces 22a and 22b can operate at 600 Mbps.

On the other hand, when the optical signals (600 Mbps) from the optical cables 24a and 24b divided into two systems are input to the next ATM switch 11, it is necessary to restore them to the original 1.2 Gbps signals. Therefore, after the 600 Mbps optical signals are received by the input side conversion interfaces 23a and 23b of the two systems, they are multiplexed at the multiplexer unit 53 and the resultant 1.2 Gbps electrical signal is input to the ATM switch 11. Note that while the example was shown of division into two systems by the demultiplexer unit 52 and multiplexing the two systems by a multiplexer unit 53, the invention is not limited to this and three or more systems can be used.

Figure 12:
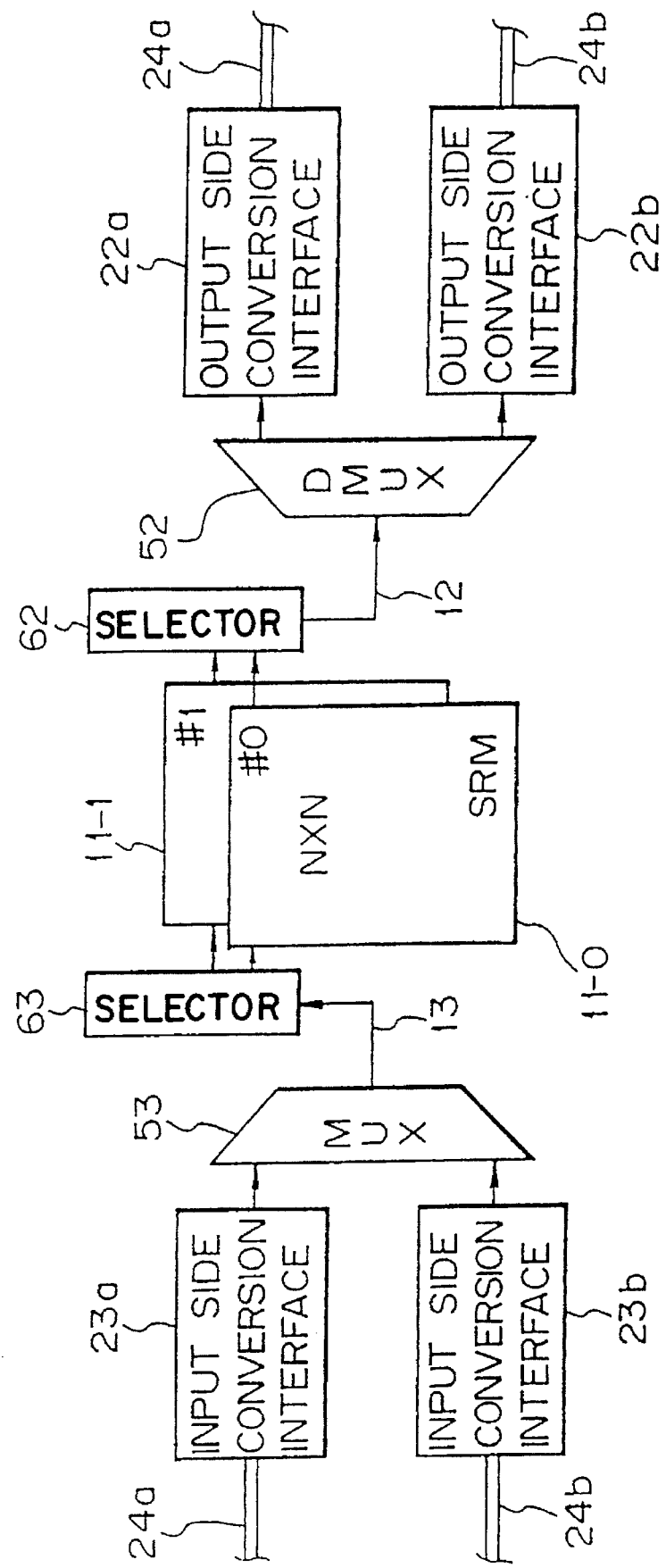
FIG. 12 is a view of an example of duplexing of the construction of FIG. 11.

FIG. 12 is a view of an example of duplexing of the construction of FIG. 11. As mentioned above, a complete duplex redundant structure is used to improve the reliability of the ATM exchange. FIG. 12 shows this complete duplex redundant structure. An output side selector 62 and an input side selector 63 are provided. These are switched while linking to each other to selectively choose the #0 system (active system) ATM switches or #1 system (standby system) ATM switches.

Figure 13:
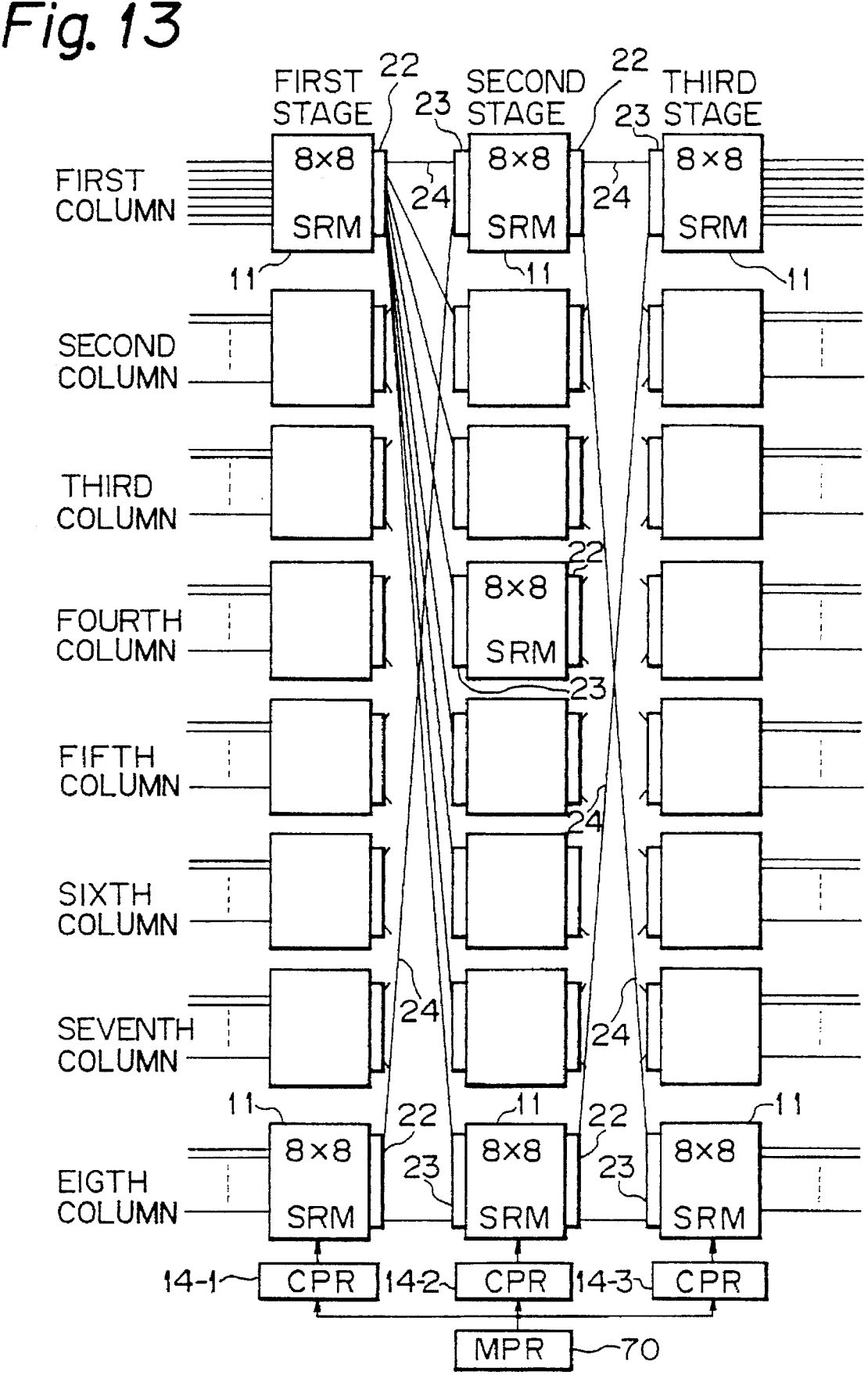
FIG. 13 is a view of the layout of a 64×64 switch construction based on the present invention.

FIG. 13 is a view of the layout of a 64×64 switch construction based on the present invention. The ATM switches 11 are 8×8 SRM construction switches and are arranged in three rows and eight columns. Therefore, there are a total of 64 incoming lines and 64 outgoing lines.

The ATM switches are controlled by a CPR 14-1, 14-2, and 14-3 and the CPR's are controlled overall by a main processor (MPR).

The ATM switches 11 have added to them one or both of an output side conversion interface 22 and input side conversion interface 23. The two conversion interfaces 22 and 23 are connected by eight optical cables 24.

As explained above, according to the present invention, while the transfer lines connecting the ATM switches inevitably become longer when extending the ATM switches, there is almost no deterioration in the capabilities of the exchanges. Therefore, it is possible to easily handle extensions of ATM switches.

We claim:

1. An exchange comprising a self-routing module, provided with a plurality of outgoing lines and a plurality of incoming lines, and for switching fixed length packets having a control information from the incoming lines to the outgoing lines through a route which is determined by the control information of the fixed length packets wherein;

the self-routing module includes a plurality of sub-self-routing modules arranged in a cascade connection, each sub-self-routing module having a plurality of output lines and a plurality of input lines where a number of output lines or input lines being less than or equal to a number of outgoing lines or incoming lines, respectively;

output side conversion interfaces and input side conversion interfaces, respectively, provided at an output side and an input side of the sub-self-routing modules both for connection of adjoining sub-self-routing modules; and optical fiber cables to connect the output side interfaces and input side interfaces facing thereto.

2. An exchange as set forth in claim 1, wherein said output side conversion interfaces are provided with electrical/optical converters at their outputs and the input side conversion interfaces are provided with optical/electrical converters at their inputs.

3. An exchange comprising a multistage cascade connection of switches of self-routing module structures which are provided with N number of outgoing lines and N number of incoming lines where N is an integer of 2 or more, and perform electrical processing for the exchange of cells from the incoming lines and output the same to predetermined outgoing line, wherein an output side and an input side of the switches are provided with an output side conversion interfaces and input side conversion interfaces, respectively, both for connection of adjoining switches and uses optical cables to connect the output side interfaces and input side interfaces facing thereto, wherein said output side conversion interfaces are provided with electrical/optical converters at their outputs and the input side conversion interfaces are provided with optical/electrical converters at their inputs, wherein said output side conversion interfaces are provided with parallel/serial converters connected to the input side of said electrical/optical converter and said input side conversion interfaces are provided with serial/parallel converters at the output side of the optical/electrical converters.

4. An exchange which is comprised of a multistage cascade connection of switches of self-routing module structures which are provided with N number of outgoing lines and N number of incoming lines where N is an integer of 2 or more, and perform electrical processing for the exchange of fixed length packets from the incoming lines and output the same to predetermined outgoing lines wherein, an output side and an input side of the switches are provided with an output side conversion interfaces and input side conversion faces, respectively, both for connection of adjoining switches;

uses optical cables to connect the output side interfaces and input side interfaces facing thereto;

wherein said output side conversion interfaces are provided with electrical/optical converters at their outputs and the input side conversion interfaces are provided with optical/electrical converters at their inputs; and wherein said output side conversion interfaces are provided with transmission side synchronization control units and input side conversion interfaces are provided with reception side synchronization control units.

5. An exchange which is comprised of a multistage cascade connection of switches of self-routing module structures which are provided with N number of outgoing lines and N number of incoming lines where N is an integer of 2 or more, and perform electrical processing for the exchange of fixed length packets from the incoming lines and output the same to predetermined outgoing lines wherein;

an output side and an input side of the switches are provided with an output side conversion interfaces and input side conversion faces, respectively, both for connection of adjoining switches;

uses optical cables to connect the output side interfaces and input side interfaces facing thereto;

wherein said output side conversion interfaces are provided with electrical/optical converters at their outputs and the input side conversion interfaces are provided with optical/electrical converters at their inputs;

wherein said output side conversion interfaces are provided with transmission side synchronization control units and input side conversion interfaces are provided with reception side synchronization control units; and wherein a transmission side synchronization control unit and a reception side synchronization control unit respectively face each other and have an optical signal synchronization pattern unit and optical signal synchronization detection unit for synchronization of optical signals sent over the optical cables between the two.

6. An exchange which is comprised of a multistage cascade connection of switches of self-routing module structures which are provided with N number of outgoing lines and N number of incoming lines where N is an integer of 2 or more, and perform electrical processing for the exchange Of fixed length packets from the incoming lines and output the same to predetermined outgoing lines wherein;

an output side and an input side of the switches are provided with an output side conversion interfaces and input side conversion faces, respectively, both for connection of adjoining switches;

uses optical cables to connect the output side interfaces and input side interfaces facing thereto;

wherein said output side conversion interfaces are provided with electrical/optical converters at their outputs and the input side conversion interfaces are provided with optical/electrical converters at their inputs;

wherein said output side conversion interfaces are provided with transmission side synchronization control units and input side conversion interfaces are provided with reception side synchronization control units; and wherein a transmission side synchronization control unit and a reception side synchronization control unit respectively face each other and having a header pattern unit and header detection unit for synchronization of fixed length packets themselves included in a optical signals sent over the optical cables between said transmission side synchronization control unit and said reception side synchronization control unit.

7. An exchange as set forth in claim 6, wherein said header pattern unit writes a synchronizing pattern in a header error control (HEC) area in said packets.

8. An exchange comprising a multistage cascade connection of switches of self-routing module structures which are provided with N number of outgoing lines and N number of incoming lines where N is an integer of 2 or more, and perform electrical processing for the exchange of cells from the incoming lines and output the same to predetermined outgoing lines, wherein an output side and an input side of the switches are provided with an output side conversion interfaces and input side conversion interfaces, respectively, both for connection of adjoining switches and uses optical cables to connect the output side interfaces and input side interfaces facing thereto, wherein a demultiplexer unit is inserted at the outgoing lines and said output side conversion interfaces are provided at the output side of the demultiplexer unit.

9. An exchange comprising a multistage cascade connection of switches of self-routing module structures which are provided with N number of outgoing lines and N number of incoming lines where N is an integer of 2 or more, and perform electrical processing for the exchange of cells from the incoming lines and output the same to predetermined outgoing lines, wherein an output side and an input side of the switches are provided with an output side conversion interfaces and input side conversion interfaces, respectively, both for connection of adjoining switches and uses optical cables to connect the output side interfaces and input side interfaces facing thereto.

wherein said input side conversion interfaces are provided and a multiplexer unit for multiplexing the output signals of said plurality of input side conversion interfaces are provided at the output side of said plurality of input side conversion interfaces and said output signals are multiplexed and inputted into the incoming lines.

10. An exchange as set forth in claim 9, wherein said exchange is formed by a complete duplex redundant structure and an output side selector and an input side selector are provided for switching between an active system and a standby system.

11. An exchange system, comprising:

a self-routing module, provided with a plurality of outgoing lines and a plurality of incoming lines and for switching fixed length packets each having control information from the incoming lines to the outgoing lines through a route which is determined by the control information of the fixed length packets, self-routing module including a plurality of sub-self-routing modules arranged in a cascade connection, each of the sub-self-routing modules having a plurality of output lines and a plurality of input lines where a number of output lines or input lines is less than or equal to a number of outgoing lines or incoming lines, respectively;

an output side conversion interface connected at an output side of each of said sub- self-routing modules;

an input side conversion interface connected at an input side of each of said sub- self-routing modules; and optical fiber cables operatively connected between output side conversion interfaces and input side conversion interfaces of adjoining sub-self-routing modules.

12. An exchange system as set forth in claim 11, wherein said output side conversion interface includes a first electrical/optical converter at an output thereof, and said input side conversion interface includes a second optical/electrical converter at an input thereof.

13. An exchange system, comprising;

a plurality of switches of self-routing module structures which are connected in a multistage cascade connection and provided with N Number of outgoing lines and N number of incoming lines where N is an integer of 2 or more, each of said plurality of switches being formed for processing of exchanges of cells inputted from the incoming lines and for outputting the exchanges of cells to predetermined outgoing lines;

an output side conversion interface connected at output side of each of said plurality of switches:

an input side conversion interface connected at an input side of each of said plurality of switches, said output and input conversion interfaces for connecting adjoining ones of said plurality of switches; and optical cable operatively connected between output side conversion interfaces and input side conversion interfaces of adjoining switches;

wherein said output side conversion interface includes a first electrical/optical converter at an output thereof, and said input side conversion interface includes a second optical/electrical converter at an input thereof;

wherein said output side conversion interface includes a first parallel/serial converter connected to an input side of the first electrical/optical converter, and said input side conversion interface includes a second serial/parallel converter at an output side of the second optical/electrical converter.

14. An exchange system as set forth in claim 13, wherein said output side conversion interface further includes a transmission side synchronization control unit at an input side of the first parallel/serial converter, and said input side conversion interface includes a reception side synchronization control unit at an output side of the second parallel/serial converter.

15. An exchange system comprising:

a plurality of switches of self-routing module structures which are connected in a multistage cascade connection and provided with N number of outgoing lines and N number of incoming lines where N is an integer of 2 or more, each of said plurality of switches being formed for processing of exchanges of fixed length packets inputted from the incoming lines and for outputting the exchanges of fixed length packets to predetermined outgoing lines;

an output side conversion interface connected at an output side each of said plurality of switches;

an input side conversion interface connected at an input side of each of said interfaces for connecting adjoining ones of said plurality of switches;.

optical cables respectively connected between output side conversion interfaces and input side conversion interfaces of adjoining switches;

wherein said output side conversion interfaces includes a first electrical/optical converter at an output thereof, and said input side conversion interface includes a second optical/electrical converter at an input thereof;

wherein said output side conversion interface includes a transmission side synchronization control unit and said input side conversion interface includes a reception side synchronization control unit; and wherein each corresponding transmission side synchronization control unit and reception side synchronization control unit respectively have an optical signal synchronization pattern unit and optical signal synchronization detection unit for synchronization of optical signals sent over said optical cables between the corresponding transmission side synchronization control unit.

16. An exchange system as set forth in claim 11, wherein the corresponding transmission side synchronization control unit and reception side synchronization control unit respectively have an ATM header pattern unit and ATM header detection unit for synchronization of cells themselves included in the optical signals sent over said optical cables between the corresponding transmission side synchronization unit.

17. An exchange system as set forth in claim 16, wherein the ATM header pattern unit writes a synchronizing pattern in a header error control (HEC) area in the cells.

18. An exchange system, comprising:

a plurality of switches of self-routing module structures which are connected in a multistage cascade connection and provided with N number of outgoing lines and N number of incoming lines where N is an integer of 2 or more, each of said plurality of switches being formed for processing of exchanges of cells inputted from the incoming lines and for outputting the exchanges of cells to predetermined outgoing lines;

an output side conversion interface connected at an output side of each of said plurality of switches;

an input side conversion interface connected at an input side of each of said plurality of switches, said output and input conversion interfaces for connecting adjoining ones of said plurality of switches; and optical cables operatively connected between output side conversion interfaces and input side conversion interfaces of adjoining switches, a demultiplexer unit connected to said plurality of switches through the N number of outgoing lines, and having a plurality of output side conversion interfaces connected at an output side of said demultiplexer unit.

19. An exchange system, comprising:

a plurality of switches of self-routing module structures which are connected in a multistage cascade connection and provided with N number of outgoing lines and N number of incoming lines where N is an integer of 2 or more, each of said plurality of switches being formed for processing of exchanges of cells inputted from the incoming lines and for outputting the exchanges of cells to predetermined outgoing lines;

an output side conversion interface connected at an output side of each of said plurality of switches;

an input side conversion interface connected at an input side of each of said plurality of switches, said output and input conversion interfaces for connecting adjoining ones of said plurality of switches: and optical cables operatively connected between output side conversion interfaces and input side conversion interfaces of adjoining switches.

a multiplexer unit connected to said plurality of switches through N number of incoming lines, and having a plurality of input side conversion interfaces connected at an input side of said multiplexer unit.

20. A redundant exchange system, comprising:

first and second pluralities of switches of self-routing module structures which are each connected in a multistage cascade connection and interconnected via optical fibers and provided with N number of outgoing lines and N number of incoming lines where N is an integer of 2 or more, each switch in said first and second pluralities as switches being formed for processing of exchanges of cells inputted from the incoming lines and for outputting the exchanges of cells to predetermined outgoing lines, said first and second pluralities of switches being connected in a duplex redundant structure with each other;

an output side selector connected to an output side of said duplex redundant connected first and second pluralities of switches;

an input side selector connected to an input side of said duplex redundant connected first and second pluralities of switches, said output and input side selectors being operatively connected to each other for switching between said first and second pluralities of switches in order to select an active system and a standby system;

an output side conversion interface connected at an output side of said output side selector;

an input side conversion interface connected at an input side of said input side selector, said output and input conversion interfaces for connecting adjoining sets of first and second pluralities of switches; and optical cables operatively connected between output side conversion interfaces and input side conversion interfaces of said first and second pluralities of switches.

21. A redundant exchange system as set forth in claim 20, further comprising:

a demultiplexer unit connected between said output side selector and a plurality of output side conversion interfaces connected at an output side of said demultiplexer unit.

22. A redundant exchange system as set forth in claim 20, further comprising:

a multiplexer unit connected between said input side selector and a plurality of input side conversion interfaces connected at an input side of said multiplexer unit.

23. An exchange comprising a plurality of self-routing modules arranged in a cascade connection, and provided with a plurality of outgoing lines and a plurality of incoming lines, and for switching fixed length packets having a field of first synchronization control information used for detection of synchronization of fixed length packets from the incoming lines, from the incoming lines to the outgoing lines wherein;

an output side conversion interfaces and input side conversion interfaces, respectively, provided at an output side and an input side of the sub-self-routing modules both for connection of adjoining self-routing modules; and optical fiber cables to connect the output side interfaces and input side interfaces facing thereto, the fixed length packets transmitting together with second synchronization control information used for detection of synchronization of said fixed length packets transferred between the self-routing modules 24. An exchange as set forth in claim 23, wherein said first synchronization control information of the fixed length packets is deleted.

25. An exchange system, comprising:

a plurality of self-routing modules, arranged in a cascade connection and provided with a plurality of outgoing lines and a plurality of incoming lines, and for switching fixed length packets having a field of first synchronization control information used for detection of synchronization of the fixed length packets from the incoming lines from the incoming lines to the outgoing lines;

an input side conversion interface connected at an output side of each of said self-routing modules;

an input side conversion interface connected at an input side of each of said self-routing modules; and optical fiber cables operatively connected between output side conversion interfaces and input side conversion interfaces of adjoining self-routing modules, the fixed length packets transmitting together with second synchronization control information used for detection of synchronization of said fixed length packets transferred between the self-routing modules.

26. An exchange system as set forth in claim 25, wherein said first synchronization control information of the fixed length packets is deleted.

* * * * *